June 9, 1925.  
R. E. KIMBALL  
FOLDING TENT AND BED EQUIPMENT FOR VEHICLES  
Filed Oct. 15, 1923    2 Sheets-Sheet 1
1,540,844
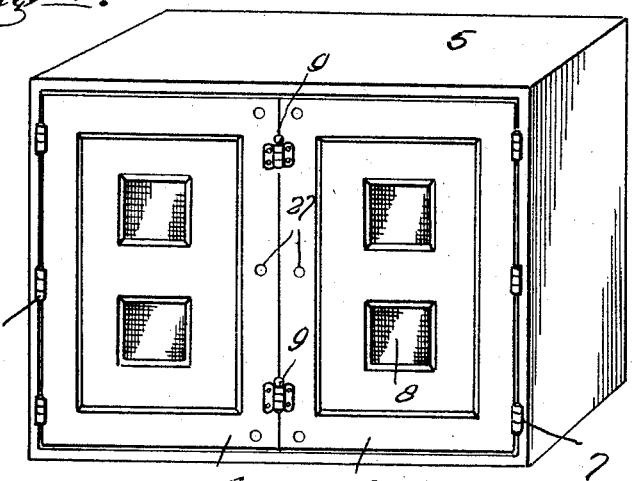
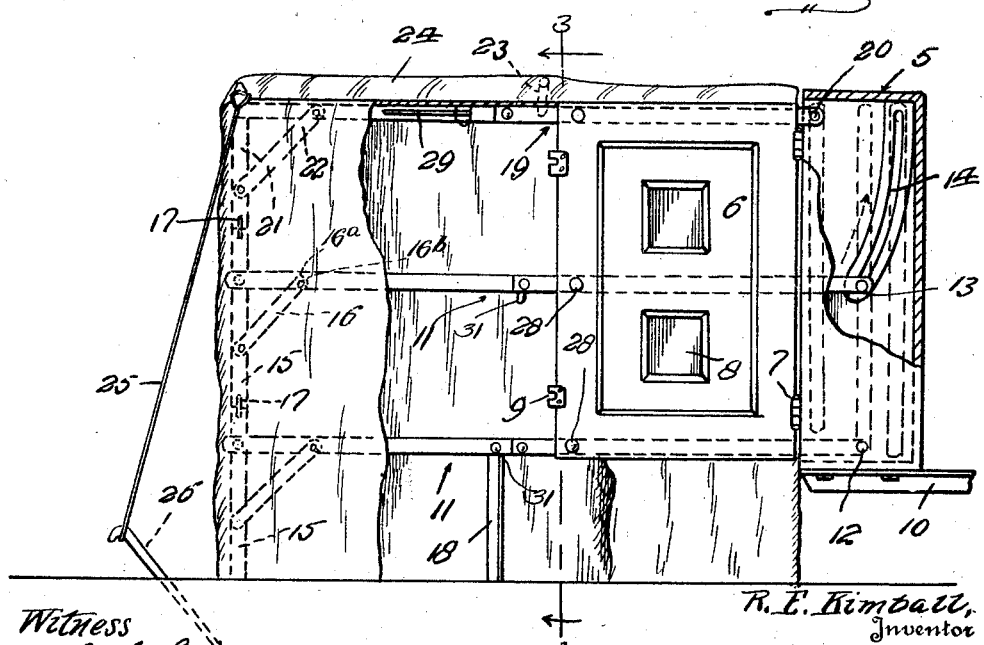

June 9, 1925.
R. E. KIMBALL
1,540,844
FOLDING TENT AND BED EQUIPMENT FOR VEHICLES
Filed Oct. 15, 1923     2 Sheets-Sheet 2
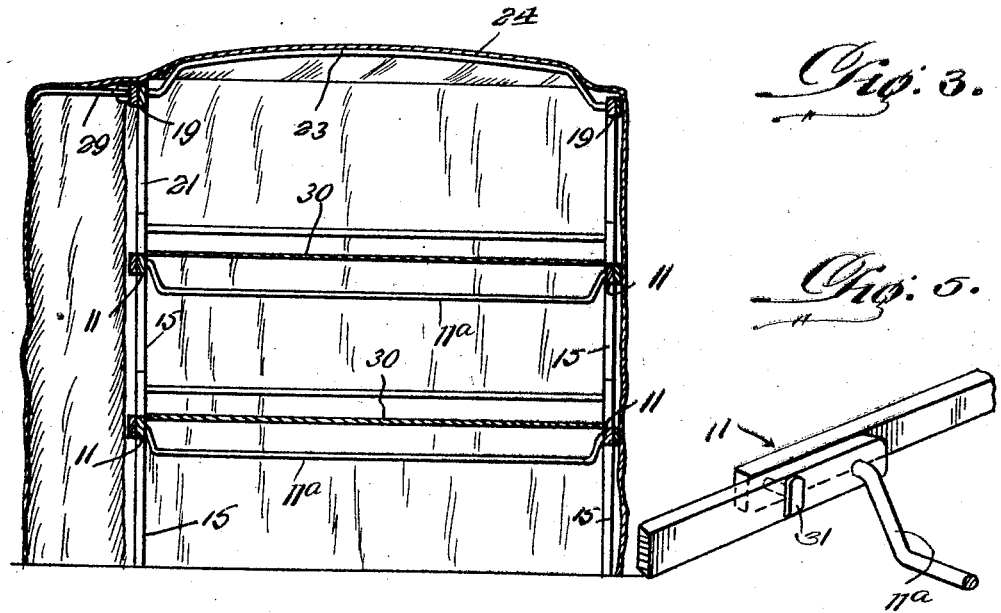
Fig. 3.
Fig. 5.
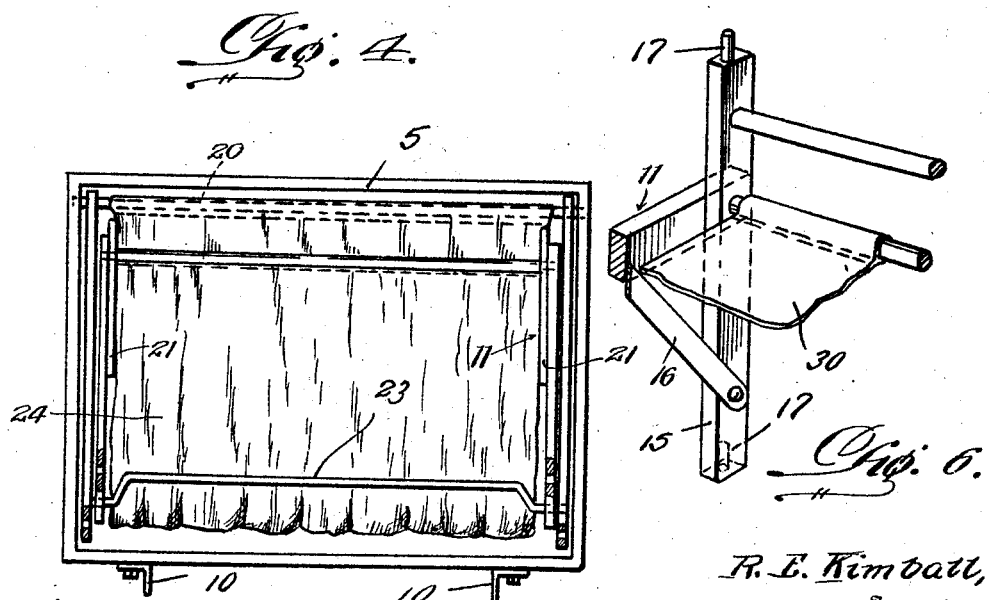
Fig. 4.
Fig. 6.
R. E. Kimball,
Inventor
Witness
Attorney Patented June 9, 1925.

1,540,844

UNITED STATES PATENT OFFICE.

ROOT E. KIMBALL, OF ST. PAUL, MINNESOTA.

FOLDING TENT AND BED EQUIPMENT FOR VEHICLES.

Application filed October 15, 1923. Serial No. 668,788.

*To all whom it may concern:*

Be it known that I, ROOT E. KIMBALL, a citizen of the United States, residing at St. Paul, in the county of Ramsey and State of Minnesota, have invented certain new and useful Improvements in Folding Tent and Bed Equipments for Vehicles, of which the following is a specification.

This invention relates to folding tent and bed equipment, and has particular reference to devices of this kind especially serviceable for campers and tourists and to be carried upon a motor vehicle.

The primary object of the invention is to provide an equipment of the above kind which is extremely simple and durable in construction, and which, when folded, may occupy a relatively small space.

Another object of the invention is to provide a folding tent and bed equipment for motor vehicles which may be expeditiously extended or set up as well as folded.

Another object is to provide a folding or collapsible tent or bed equipment for motor vehicles which, when extended, will be compact and neat in appearance, and provide ample and comfortable accommodations for several persons.

Still another object of the invention is to provide an equipment of the above kind, wherein the beds are arranged in superposed arrangement similar to the arrangement of berths within railway cars and wherein provision is made for providing ample dressing room at one side of the folding bed structure.

Still another object is to provide an equipment of the above kind which is of generally simplified and improved form so as to meet with all of the requirements for a successful commercial use.

Other objects will appear as the nature of the invention is better understood, and the same consists in the novel form, combination, and arrangement of parts hereinafter more fully described, shown in the accompanying drawings and claimed.

In the drawings, wherein like reference characters indicate corresponding parts throughout the several views:

Figure 1 is a perspective view of a folding tent and bed equipment constructed in accordance with the present invention, and shown in collapsed or folded position.

Figure 2 is a view partly in side elevation and partly in longitudinal section of the device shown in Figure 1, when in its extended or unfolded position.

Figure 3 is a transverse vertical sectional view, taken upon the line 3—3 of Figure 2.

Figure 4 is a rear elevational view of the device in the position shown in Figure 1, with the doors of the receptacle open or removed.

Figure 5 is an enlarged fragmentary perspective view, illustrating details of the frame construction, and Figure 6 is a view similar to Figure 5, illustrating further details of the frame construction.

Referring more in detail to the drawings, the present invention embodies a receptacle consisting of a substantially rectangular body portion 5, the rear side of which is open and is closed by means of horizontally swinging doors 6 that are hinged to the side walls of the body portion 5 of the receptacle along their outer vertical edges, as at 7, the doors 6 being provided with foraminous, transparent or other panels 8, as desired. Also, means is provided as generally indicated at 9 for releasably holding the adjacent inner edges of the doors in alignment when in closed position. This receptacle is adapted to be supported at the rear end of an automobile in any well known or preferred manner, such as by means of horizontal bars 10 that are adapted to be rigidly secured to the chassis of the automobile and to project rearwardly from the latter at opposite sides of the bottom wall of the receptacle body 5.

The receptacle thus provided carries a foldable or collapsible combined tent frame and bed frame construction adapted to be extended rearwardly of the automobile when set up. This construction embodies the pair of collapsible beds, each having side rails 11 formed of pivotally connected rail sections or links, the lower or inner ends of each of the rails of the lower bed frame being hinged as at 12 against the inner sides of each of the side walls of the receptacle body 5 as shown clearly in Figure 2. The inner ends of the side rails 11 of the upper bed frame are connected by a cross bar 13, the ends of which are pivotally and slidably positioned in guide grooves or slots 14 provided at the inner sides of the side walls of the body 5, which grooves terminate at a point substantially midway between the top and bottom walls of the body 5 and curve downwardly and outwardly as shown at Figure 2. The outer ends of the side rails 11 are provided with folding legs 15 which are releasably held in upright depending position by means of pivoted braces 16 operatively connected with said legs and the side rails 11 as shown. The connection between the upper end of the links 16 and the rail is preferably provided by equipping the upper end of the links or braces with hooks 16ª for detachable connection with pins 16ᵇ extending at right angles from the rails. When the bed frames are extended, the legs 15 of one of the same are disposed to rest upon the upper ends of the legs of the other, and in order to detachably join these superposed legs and to hold the same against relative displacement, dowel connections are provided between the adjacent ends of the same as generally indicated at 17. The sections of the side rails of the lower bed frame are held in unfolded condition or against downward folding at their pivotal connections by means of a hinged supporting leg 18, carried by each of said side rails and adapted to engage the ground when the device is set up as shown in Figure 2.

Referring to Figure 5 it will be seen that the links of the side rails are pivotally connected together at their adjacent ends through the medium of the ends of the cross members or rods 11ª. In order to hold the links in alignment with each other, they may be formed with aligned openings for passage of the shank of a headed bolt 31. The cross pieces 11ª are bowed downwardly to space them below the stretches of fabric forming the bed bottoms and to be hereinafter referred to.

A further pair of side rails 19 are provided above the bed frames, and each of these rails are also formed of hingedly connected sections, the inner ends of the inner links or sections of which are pivoted as at 20 to the side walls of the receptacle bodies 5, adjacent the open front thereof, and directly beneath the top wall of the same. The rails 19 also carry foldable legs 21, that are held in depending vertical position by means of braces 22 similar to the braces 16 and the lower ends of the legs 21 are connected with the upper ends of the legs 15 of the upper bed frame by dowel connections 17 before mentioned. Connecting the rail 19 is a transversely arranged bow 23 that may be swung upwardly for supporting a suitable fabric tent covering 24 in slightly elevated position, and this covering is of sufficient size to cover the top of the entire structure and to extend downwardly along the sides and outer ends thereof to a point adjacent the ground as shown in Figure 2. The whole structure may be suitably braced by means of a guy wire or rope 25 attached to the outer ends of one of the rails 19 and extending outwardly and downwardly to a stake 26 that is driven into the ground for this purpose.

The doors 6 are provided along their vertical free edges with openings 27 adapted to align with similar openings provided in the inner sections of each of the rails 11 and 19 and through which aligned openings, bolts 28 are extended and secured whereby the doors are utilized to brace and maintain the rails 11 and 19 in their proper horizontal parallel relation and to sustain to a great extent, any weight imposed upon the bed frame.

One or more arms 29 are hinged to the side rail 19 at one side of the device for horizontal swinging movement so that when said arms are swung outwardly as shown in Figure 3, the covering 24 will be supported in spaced relation to the adjacent side of the structure to provide ample dressing room at this side of the same.

A suitable fabric or other bed bottom 30 is supported in any desired or well known manner between the side rails 11 of each bed frame, and it will thus be seen that when the device is extended as shown in Figure 2, superimposed beds or berths are provided for the accommodation of several persons within the tent covering 24 that is supported within the upper frame including the rails 19. Assuming that the device is extended or set up as shown in Figure 2, the manner of folding the device will be as follows:

The bolts 28 are first disconnected from the rails 11 and 19, and then the legs 15 and 21 together with their braces 16 and 22 are folded parallel with the rails 11 and 19. The lower rails 11 are then folded in an upward direction, so as to swing into the receptacle body 5 first. The upper rails 11 are then folded in a downward direction, while the inner ends of the inner sections thereof are simultaneously moved upwardly in the grooves 14, and then the bed frames are disposed in vertical adjacent relation as indicated by dotted lines in Figure 2. The rails 19 are then folded in a downward direction, it being noted that the guy wire or rope 25 has been previously released from the stake 26. The covering 24 may be removed from the frame or folded therewith as found most desirable and with the parts thus disposed within the receptacle body 5, the doors 6 are swung closed and secured together by the means 9 which may consist of a lock, latch or the like. In extending the device from its collapsed position, the legs 15 are pulled outwardly first, and then the upper rails 11 are extended, after which the lower rails 11 are extended. The legs 15 and 21 are then unfolded and their braces 16 and 22 operatively positioned, whereupon the dowel connections 17 between the legs are engaged. The bolts 28 are then applied, after which the leg 18 may be lowered and the guy rope 25 engaged with a stake 26 driven in the ground as shown in Figure 2. When the dressing room or space is desired, the arms 29 are swung outwardly as shown in Figure 3.

From the foregoing description it will be seen that the device embodies the desired qualities of simplicity and durability of construction, and presents an equipment that will be found very serviceable to tourists and campers and that will be easily collapsed or set up within a short space of time.

Minor changes may be made without departing from the spirit and scope of the invention as claimed.

What I claim as new is:

1. A folding bed for vehicles comprising a plurality of pairs of vertically spaced superposed bed supporting rails, said rails being disposed in transversely spaced parallelism and each rail being composed of a pair of links pivotally connected together at their adjacent ends, an open front receptacle to the side walls of which the inner ends of said rails are pivotally connected to permit folding of the structure into the receptacle, legs pivoted to the outer ends of the rails, the legs of the superposed pairs of rails having their ends arranged in abutting relation and detachably connected together, braces carried by the legs and having detachable connection with the rails for maintaining the legs in vertical position, a door pivotally connected to the open side of the aforesaid receptacle, said door being adapted to extend at right angles to the receptacle, and detachable connections between the free vertical edges of the door and the several superposed rails.

2. A folding bed for vehicles comprising a plurality of pairs of vertically spaced superposed bed supporting rails, said rails being disposed in transversely spaced parallelism and each rail being composed of a pair of links pivotally connected together at their adjacent ends, an open front receptacle to the side walls of which the inner ends of said rails are pivotally connected to permit folding of the structure into the receptacle, legs pivoted to the outer ends of the rails, the legs of the superposed pairs of rails having their ends arranged in abutting relation and detachably connected together, braces carried by the legs and having detachable connection with the rails for maintaining the legs in vertical position, a door pivotally connected to the open side of the aforesaid receptacle, said door being adapted to extend at right angles to the receptacle, detachable connections between the free vertical edges of the door and the several superposed rails, a covering for the frame structure supported by the rails and legs, means carried by the upper pair of rails for supporting and bowing that portion of the cover extending thereover, and additional means carried by one of the rails of said upper pair for spacing one side of the covering from the frame structure to form a dressing compartment.

In testimony whereof I affix my signature.

ROOT E. KIMBALL.